US011244221B2

(12) United States Patent
Kamath et al.

(10) Patent No.: US 11,244,221 B2
(45) Date of Patent: Feb. 8, 2022

(54) OPTIMISTIC DATA RETRIEVAL IN A PROCESS CONTROL ENVIRONMENT

(71) Applicant: AVEVA SOFTWARE, LLC, Lake Forest, CA (US)

(72) Inventors: Vinay T. Kamath, Rancho Santa Margarita, CA (US); Yevgeny Naryzhny, Foothill Ranch, CA (US); Alexander Vasilyevich Bolotskikh, Ladera Ranch, CA (US); Abhijit Manushree, Laguna Nigel, CA (US); Elliott Middleton, Tyler, TX (US); Bala Kamesh Sista, Irvine, CA (US)

(73) Assignee: AVEVA SOFTWARE, LLC, Lake Forest, CA (US)

( * ) Notice: Subject to any disclaimer, the term of this patent is extended or adjusted under 35 U.S.C. 154(b) by 21 days.

(21) Appl. No.: 16/928,790

(22) Filed: Jul. 14, 2020

(65) Prior Publication Data

US 2020/0342283 A1 Oct. 29, 2020

Related U.S. Application Data

(62) Division of application No. 16/299,366, filed on Mar. 12, 2019, now Pat. No. 10,713,556, which is a (Continued)

(51) Int. Cl.

*G06M 1/28* (2006.01)
*B65B 65/08* (2006.01)

(Continued)

(52) U.S. Cl.

CPC ............... *G06M 1/28* (2013.01); *B65B 57/20* (2013.01); *B65B 65/08* (2013.01); *G05B 19/41865* (2013.01); *Y02P 90/02* (2015.11)

(58) Field of Classification Search

CPC .......... G06M 1/28; B65B 57/20; B65B 65/08; Y02P 90/02; G05B 19/41865

See application file for complete search history.

(56) References Cited

U.S. PATENT DOCUMENTS 6,650,957 B1 11/2003 Campbell et al.
2002/0139091 A1* 10/2002 Kraenzle ................ B65B 57/20 53/467

(Continued)

*Primary Examiner* — Yasser A Abdelaziez
(74) *Attorney, Agent, or Firm* — Greenberg Traurig, LLP

(57) ABSTRACT

Processing raw data stored in an historian device for determining an amount of products passed through a process element in a process control environment is described. A count value is incremented by a counter at a rate at which products pass through the process element. The count value rolls over to zero when the count value reaches a rollover value R. An historian device periodically receives count value data points from the counter. A deadband value D is set in the historian device for distinguishing between rollovers, resets, and reversals. A client device queries the historian device for an amount of products passed through the process element for a timeframe. The historian device selects a set of count value data points from within the queried timeframe. The historian device determines, based on the selected data points and their quality, an amount of products passed through the process element.

8 Claims, 4 Drawing Sheets

Related U.S. Application Data division of application No. 14/970,076, filed on Dec. 15, 2015, now abandoned.

(60) Provisional application No. 62/092,059, filed on Dec. 15, 2014.

(51) Int. Cl.
*B65B 57/20* (2006.01)
*G05B 19/418* (2006.01)

(56) References Cited

U.S. PATENT DOCUMENTS

| | | | | |
|---|---|---|---|---|
| 2003/0204278 | A1* | 10/2003 | Grasshoff ........ | G05B 19/41875<br>700/96 |
| 2011/0029984 | A1 | 2/2011 | Norman et al. | |
| 2014/0007419 | A1 | 1/2014 | De Martin | |
| 2016/0173649 | A1 | 6/2016 | Kamath et al. | |

* cited by examiner

HISTORIAN DEVICE
104
HSM 104A
MSD 104B
PROC 104C
HCM 104D
COUNTER
106
100
CLIENT DEVICE
102
MSD 102A
PROC 102B
DISP 102C
PROCESS ELEMENT 108

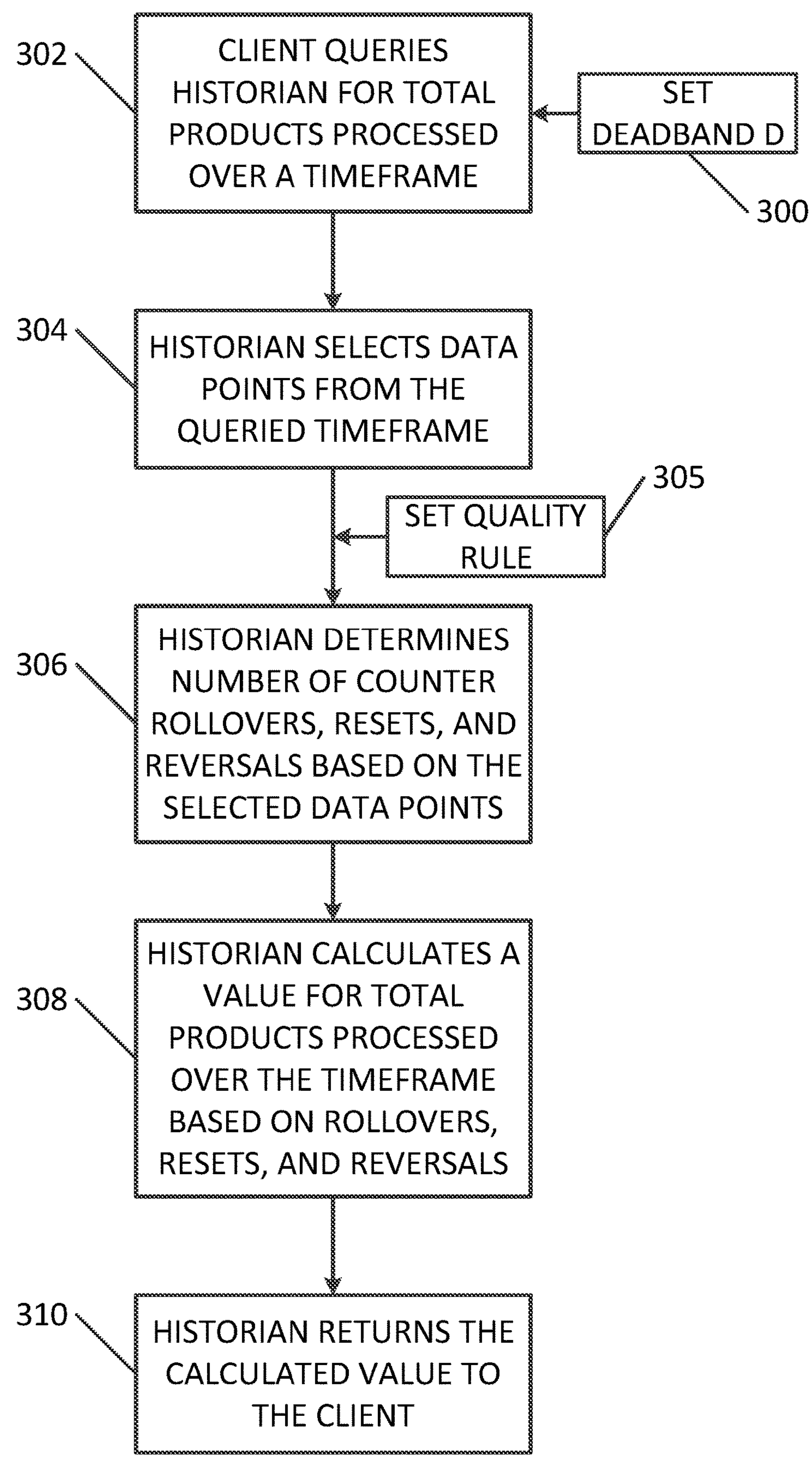
FIG. 3
302
CLIENT QUERIES HISTORIAN FOR TOTAL PRODUCTS PROCESSED OVER A TIMEFRAME
SET DEADBAND D
300
304
HISTORIAN SELECTS DATA POINTS FROM THE QUERIED TIMEFRAME
305
SET QUALITY RULE
306
HISTORIAN DETERMINES NUMBER OF COUNTER ROLLOVERS, RESETS, AND REVERSALS BASED ON THE SELECTED DATA POINTS
308
HISTORIAN CALCULATES A VALUE FOR TOTAL PRODUCTS PROCESSED OVER THE TIMEFRAME BASED ON ROLLOVERS, RESETS, AND REVERSALS
310
HISTORIAN RETURNS THE CALCULATED VALUE TO THE CLIENT Counter query
Value
Time
C0
C1
C2
C3
PC0
PC1
PC2
PC3
P1
P2
P3
P4
P5
P6
P7
P8
P9
P10
P11
P12
Gap
TC0
TC1
TC2
TC3

OPTIMISTIC DATA RETRIEVAL IN A PROCESS CONTROL ENVIRONMENT

CROSS-REFERENCE TO RELATED APPLICATIONS

This application is a divisional of U.S. patent application Ser. No. 16/299,366, filed Mar. 12, 2019, which is a divisional of U.S. patent application Ser. No. 14/970,076, filed Dec. 15, 2015, which claims the benefit of U.S. Provisional Patent Application No. 62/092,059, filed Dec. 15, 2014. The contents of the above-referenced applications are incorporated herein in their entirety by reference.

Co-owned, U.S. patent application Ser. No. 14/970,086 (now U.S. Pat. No. 9,967,369), filed Dec. 15, 2015, is incorporated herein in its entirety by reference.

Co-owned, U.S. patent application Ser. No. 14/970,062 (now U.S. Pat. No. 9,992,308), filed Dec. 15, 2015, is incorporated herein in its entirety by reference.

BACKGROUND

Industry increasingly depends upon highly automated data acquisition and control systems to ensure that industrial processes are run efficiently, safely, and reliably while lowering their overall production costs. Data acquisition begins when a number of sensors measure aspects of an industrial process and periodically report their measurements back to a data collection and control system. Such measurements come in a wide variety of forms. By way of example, the measurements produced by a sensor/recorder include: temperature, pressure, pH, and mass/volume flow of material, as well as a tallied inventory of packages waiting in a shipping line and/or a photograph of a room in a factory. Such process systems generate large and varied quantities of data which are stored in a raw form and must be processed into useful information. Ensuring that the raw data is processed into accurate information is vital for evaluating and improving the process system.

SUMMARY

Briefly, aspects of the present invention involve processing raw data stored in an historian device into information in response to a query from a client device in a process control environment.

In one aspect, a method for determining an amount of products passed through a process element in a process control environment is described. A count value is incremented by a counter at a rate at which products pass through the process element. The count value rolls over to zero when the count value reaches a rollover value R. An historian device periodically receives count value data points from the counter. A deadband value D is set in the historian device for distinguishing between rollovers, resets, and reversals. A client device queries the historian device for an amount of products passed through the process element 108 for a timeframe. The historian device selects a set of count value data points from within the queried timeframe. The historian device determines, based on the selected data points, an amount of products passed through the process element.

In a further aspect, a method of retrieving data from an historian device in a process control environment is described. A query for a result over a timeframe is received by an historian device from a client device connected to the historian device. The historian device selects data points within the timeframe wherein at least one of the data points can be a NULL value. The historian device sets a quality rule mode. In one embodiment, the mode comprises a 'GOOD' quality rule mode, an 'EXTENDED' quality rule mode, and/or an 'OPTIMISTIC' quality rule mode. The historian device calculates the result based on the selected data points. The historian device returns the calculated result to the client device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 3 is a sequence diagram of the process of the historian device 104 responding to a query from the client device 102 for a total based on gathered counter 106 value data points.

Corresponding reference characters indicate corresponding parts throughout the drawings.

DETAILED DESCRIPTION

Aspects of the present invention generally relate to the field of processing data gathered from a process control environment into useful information for users. A process control environment includes a facility or factory containing equipment that facilitates the automation of a process. In an embodiment, the process is for the manufacture or production of products, including goods for sale or ingredients for use in other processes or the like. Products produced are mechanical, chemical, or electrical in nature, or some combination thereof. The environment includes equipment or process elements necessary to facilitate the process, as well as equipment to automate the process. The equipment includes, for example, controllers for organizing and directing the other equipment in the process, actuators for physically or electrically causing actions directed by the controllers, sensors for gathering information about the process to provide feedback to the controllers, and the like. The process control environment according to embodiments of the invention includes interface devices that enable users to view information about the process. An interface device comprises, for example, a personal computer, server computer, mobile device, or the like.

Figure 1:
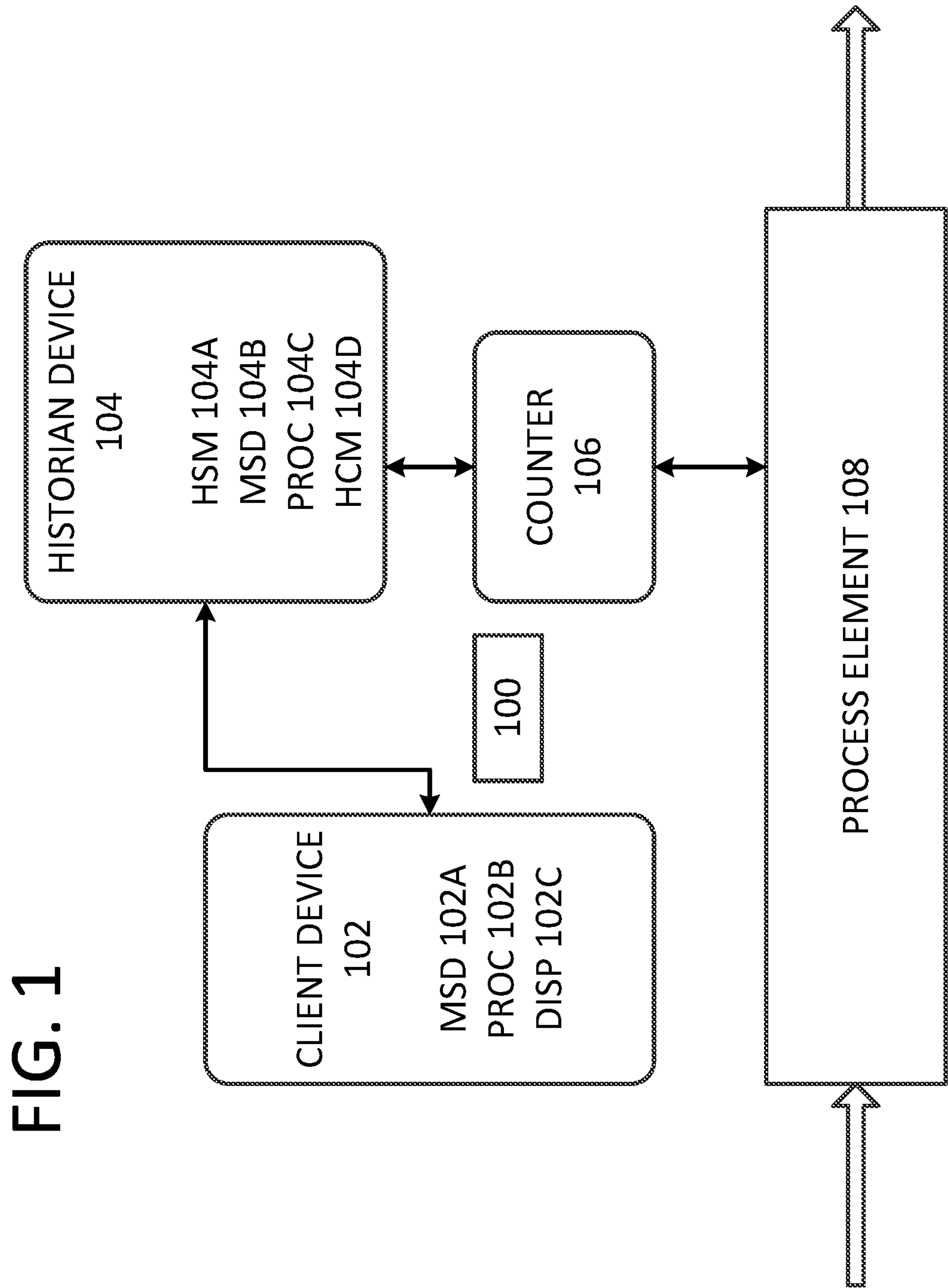
FIG. 1 is a block diagram of a client device 102, historian device 104, counter 106 and process element 108 and the relations between them.

In an embodiment, the process control system 100 includes a client device 102, an historian device 104, a counter 106, and a process element 108. FIG. 1 shows an exemplary block diagram of a relationship between the parts of the process control system. The client device 102 is, for example, a stationary computer or a mobile device. Preferably, the client device 102 comprises at least a memory storage device (MSD) 102A, a processor 102B, and a display device 102C. The client device 102 in an embodiment also includes an interface through which a user may control the process or change the information that is being displayed on the display device. The memory storage device of the client device 102 contains processor-executable instructions for the operation of the client device 102. The processor is configured to execute the instructions to cause the client device 102 to operate. The display device can be any sort of device capable of displaying process information to a user. This could include a computer monitor, a touch screen on a mobile device or the like.

The process control system in the illustrated embodiment of FIG. 1 also includes an historian device 104. The historian device 104 is passed data that is gathered from the process for storage and processing. An important part of an effective process control system is the analysis of data from the process in order to make educated decisions about how to improve the process. The historian device 104 comprises, for example, an historian server module (HSM) 104A that stores historical data for later use and analysis. The historian device 104 further comprises, for example, one or more memory storage devices (MSD) 104B that store the data gathered from the process and processer-executable instructions and a processor 104C for executing the instructions. In turn, the processer-executable instructions direct the operation of the historian device 104.

In an embodiment, the historian device 104 also comprises an historian connection module (HCM) 104D. The historian connection module 104D behaves as an interface for connecting to and interacting with the historian device 104. The historian connection module 104D is connected to a network to other devices in the process control system, including a client device 102 as described above. The network connection may be over any type of communication network. The network may be either wired or wireless and either private or public. It may include use of the World Wide Web or other large network. Because the network connection is flexible, the historian connection module 104D is configured to connect to devices that are far removed from the location of the historian device 104. The historian device 104 and client device 102 could be in the same room, or on separate continents. The connection between the historian device 104 and client device 102 preferably connects in a typical manner of two devices connecting via a network.

The process element 108 shown in FIG. 1 comprises a device or set of equipment and devices through which products of the process pass. This may include discrete products like widgets being transported on a conveyor belt or more fluid products like volumes of fluid passing through a pipe. The process element 108 may execute some form of processing on the products, or it may even comprise the entire process.

The counter 106 shown in FIG. 1 is connected to the process element 108 and keeps track of products passed through the element by incrementing a counter 106 value. The counter 106 comprises mechanical, electrical, or software elements or some combination thereof. The counter 106 preferably comprises a rollover value, after which the counter 106 rolls the count value over to 0 and continues incrementing from there. For instance, if a counter 106 has a rollover value of 10,000, then when the count value is 9,999 and another widget passes over the conveyor belt element being counted, the count rolls over to a count value of 0.

Figure 2:
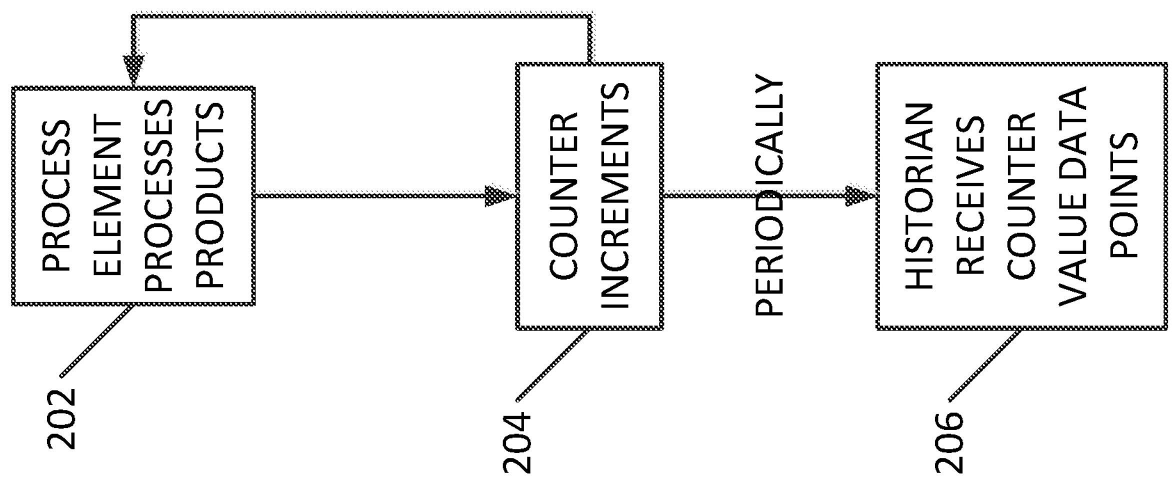
FIG. 2 is a sequence diagram of the process of gathering counter 106 data in the historian device 104 from the process element 108 and counter 106.

The counter 106 is connected to the historian through a network or other communication means. The connection between the counter 106 and historian device 104 may comprise additional intervening devices, computers, or controllers. The flowchart in FIG. 2 shows the process of gathering data from the process element 108 by the counter 106 and historian device 104. The process element 108 processes products at 202 according to its function and the counter 106 increments at 204 for each processed product. Periodically, counter 106 value data points are sent at 206 from the counter 106 to the historian device 104 for storage and processing. The historian device 104 stores the data points in the one or more memory storage devices. The difference between the gathered data points is preferably a short enough timespan that the number of products passed through the process element 108 can be accurately inferred from analysis of the data points.

The data points as gathered in the historian device 104 are in a raw form of periodic counter 106 value data points. More useful information may be inferred from the raw data after the historian device 104 processes the data points. The historian device 104 preferably processes the raw data into information after a specific query for the information is received. The flowchart of FIG. 3 describes a process of the client device 102 querying the historian device 104 for a total number of products processed over a timeframe. Preferably, the queried timeframe is long enough that the historian device 104 has a sufficient number of data points to determine an accurate value. For instance, if the historian device 104 only has one or two data points for a given timeframe, it may be difficult to produce an accurate total. However, if the historian device 104 has ten or more data points for the timeframe, an accurate total is more likely.

Upon receiving the query at 302, the historian device 104 selects at 304 the data points that fall into the queried timeframe. Preferably each data point comprises a value and a timestamp, enabling the historian device 104 to accurately determine which data points fall into the timeframe. In an embodiment, the historian device 104 increments at 306 the total by the rollover value of the counter 106 for each time a rollover is detected based on the data point values. A rollover can be detected when a preceding counter 106 value is greater than the following counter 106 value. For instance, if the counter 106 has a rollover value of 100 and a preceding data value is 99 and a following data value is one, the historian determines that a rollover has occurred and the total is increased by the rollover value of 100.

However, the historian device 104 must also account at 306 for resets and reversals. A reset occurs when a counter 106 is manually reset before the rollover value has been reached. A reversal occurs when the process element 108 and counter 106 are manually reversed to a previous spot. For instance, if a user at a plant found that some widgets on a conveyor belt needed to be reprocessed, the user may reverse the belt to the point that the widgets would be reprocessed. Resets and reversals are detected by the historian device 104 as well to ensure an accurate total.

The historian device 104 uses a deadband value that has been set to enable the historian device 104 to accurately determine the difference between rollovers, resets, and reversals. Without a deadband, the counter 106 reflects accumulated values, but not rates and quantities, which in some environments are more important for reporting. The purpose of the counter retrieval mode is to use a tag's rollover point to calculate and return the delta change between consecutive cycles. Exceptions (e.g., "reverse" and "reset") can make the calculated rates unreliable. When exceptions such as reversals or resets occur, the retrieval mode can miscompute the number of units per period assuming the value rolled over. The deadband configuration provides a way for the user to add tolerance for reversals and resets.

The deadband value operates as a percentage of the rollover value of the counter 106. In an embodiment, where the rollover value of the counter 106 is R, the deadband value is D, and a preceding data point is X while the following data point is Y, detection of rollovers, resets, and reversals is as follows:

If $X>Y$ and $X<R*(1-D/100)$ and $Y<R*D/100$, the historian device 104 determines that a reset has occurred.

If $X>Y$ and $X-Y<R*D/100$, the historian device 104 determines that a reversal has occurred.

If $X>Y$ and the historian does not determine that either a reset or reversal has occurred, the historian device 104 determines that a rollover has occurred.

For instance, if the rollover value R is 100, the deadband value D is 10, and values X and Y are 85 and 5 respectively, the historian device 104 would calculate that 85 is greater than 5, 85 is less than 90 ($100*(1-10/100)=100*0.9=90$), and 5 is less than 10 ($100*10/100$). These values X and Y would be treated as a reset.

If the rollover value R is 100, the deadband value D is 10, and values X and Y are 75 and 70 respectively, the historian device 104 would calculate that 75 is greater than 70 and 5 ($75-70$) is less than 10 ($100*10/100$). These values X and Y would be treated as a reversal.

Finally, if the rollover value R is 100, the deadband value D is 10, and values X and Y are 95 and 5 respectively, the historian device 104 would calculate that 95 is greater than 5, a reset has not occurred (95 is not less than 90), and a reversal has not occurred ($95-5$ is not less than 10). These values of X and Y would be treated as a rollover.

The total value calculated by the historian device 104 at 308 is increased or decreased based on the determined occurrences of rollovers, resets, and reversals. If a rollover is determined to have occurred, the total value is increased by the rollover value. The historian device 104 infers that the counter 106 has counted at least enough products to cause the counter 106 to rollover. If a reset is determined to have occurred, the historian device 104 infers that the counter 106 did not make it to the rollover value before the reset. In this case, the historian device 104 increases the total by the value of the preceding data point. If a reversal is determined to have occurred, the historian device 104 infers that the total value must be reduced by the difference between the values of the preceding data point and the following data point in order to prevent the reversed products from being counted twice. Once all of the rollover, reset, and reversal events have been accounted for in the calculated total, the historian device 104 takes account of any remaining data points in the queried timeframe and returns the calculated total to the client at 310 via the network connection.

The deadband value used by the historian device 104 to make the above determinations can be adjusted to increase the accuracy of the determinations. Preferably, the default deadband value is 10.

In an embodiment, the historian device 104 uses multiple cycles of time within a queried timeframe to divide up the data points during the calculation. The number of cycles is based on a specified resolution or cycle count. A number of rollovers, resets, and reversals may be determined for each cycle and the totals from the cycles combined to form a final total. The historian device 104 calculation based on the counter 106 value data points are applied for both integer analog data and real analog data. For integer analog data, the result will be in the form of an integer. For real analog data, the result can include fractional values.

In an embodiment, the counter 106 does not have a rollover value and is only manually reset. The rollover value of the counter 106 is set to O to reflect this property. In the case where automatic rollovers do not occur, the historian device 104 treats determined rollovers as resets.

Figure 4:
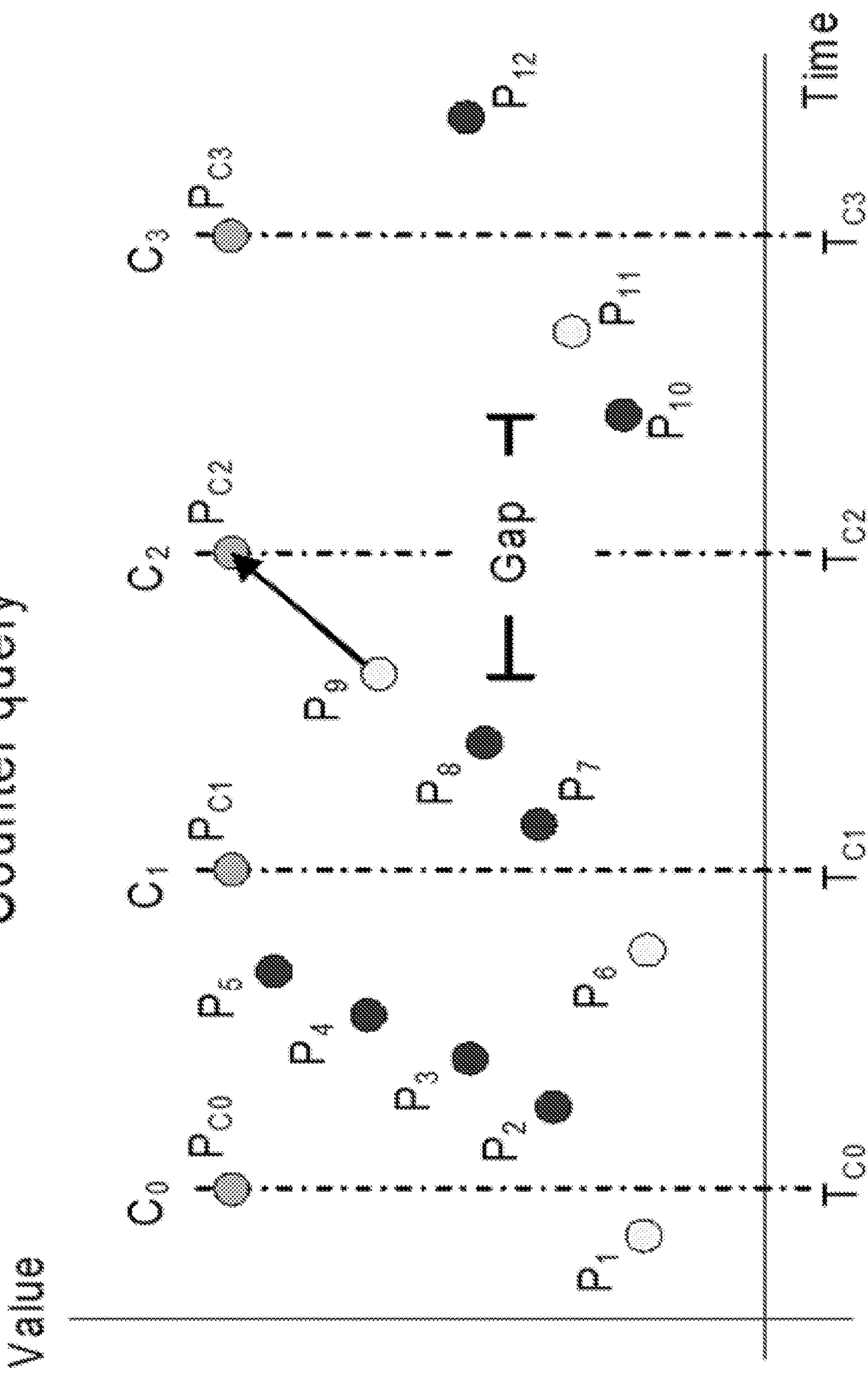
FIG. 4 is an exemplary graph of gathered counter 106 value data points.

FIG. 4 shows an example set of data points graphed with value on the y-axis and time on the x-axis. Data points P1-P12 have been saved by the historian device 104 through the queried timeframe. Cycle divisions Tc0-Tc3 represent cycles throughout the queried timeframe. A query is run with a start time of TC0 and an end time of TC3. The resolution has been set in such a way, that data will be returned for three complete cycles starting at TC0, TC1 and TC2 and an incomplete cycle starting at TC3.

In an embodiment, the historian device 104 processes data values that are of lower quality or NULL. Of the points in FIG. 4, eleven points P1-P8 and P10-P12 represent normal analog values, and one point, P9, represents a NULL data point (e.g., a missing data point due to, for example, an I/O server disconnect) which causes a gap in the data between P8 and P10.

All points are found and considered by the counter 106 retrieval mode, but only the P1, P6, P9, and P11 are used to determine which values to return to the client. The returned points for each cycle are inferred as PC0, PC1, PC2 and PC3. There is not a simple relationship between them and any of the actual points.

All cycle values are calculated as the delta change between the cycle time in question and the previous cycle time, taking into account the number of rollovers that have occurred between the two points in time. The initial value to be returned at the query start time (PC1) is calculated the same way, only based on a phantom cycle prior to the query start time. The counter 106 algorithm will assume that a rollover occurred if the current value is lower than the previous value.

For example, the formula to calculate PC1 is as follows:

$$PC1=n*VR+P6-P1$$

where:

n=the number of rollovers that have occurred during the course of the cycle.

VR=the set rollover value for the counter 106.

If either nor VR are equal to zero, PC1 is simply the difference between the values P1 and P6.

In the case of cycle C2, there is no value at the cycle time, so the NULL value represented by point P9 is returned. In the case of cycle C3, a NULL is again returned, because there is no counter 106 value at the previous cycle boundary to use in the calculation. There must be a full cycle of values in order for the counter 106 to be calculated.

If a gap is fully contained inside a cycle, and if points occur within the cycle on both sides of the gap, then a counter 106 value will be returned, even though it may occasionally be erroneous. Zero or one rollovers are assumed, even though it might in fact have rolled over multiple times.

An initial value is returned using the period leading up to the query start time. A data point that has a cycle time is used to generate counter 106 value for its preceding cycle. A NULL point with cycle time will cause the preceding cycle to end in a gap and the following cycle to start in a gap.

In an embodiment, a historian device can support various quality indicators such as quality legacy and quality detail. As used herein, "quality" refers to a quality property to indicate how to treat the data point value. For example, in one embodiment, a quality of 'DOUBTFUL' will be used with the counter 106 result for a cycle if a NULL point is considered for the cycle and the counter 106 result is not NULL.

In an embodiment, if a quality rule of the query is configured as an 'OPTIMISTIC' quality rule mode, the historian device includes in the retrieval calculations data points with both a 'GOOD' quality and a 'DOUBTFUL' quality except that data points with a 'BAD' quality will not be included in a calculation.

Otherwise, if any points considered in a cycle have 'DOUBTFUL' quality, the result for that row will also have 'DOUBTFUL' quality. A cycle that starts or ends in a gap will be labeled as having a 'BAD' quality.

If the configured rollover value is larger than 0.0, then the data points whose values are equal to or larger than the rollover value will cause the counter 106 value for the cycle to be set to 0.0, with a filtered point applied to its quality.

If any data point with value less than 0.0 is found in a cycle, the counter 106 value for the cycle will be set to 0.0, with a filtered point applied to its quality.

In an embodiment, the historian device 104 receives data points from a variety of sensor types including a counter 106. Each of the sensors provides data points that include a data value, a timestamp, and a quality value. The quality value can be set to a variety of possible values which indicate certain statuses of the value. For instance, the quality value will be 'GOOD' if the value was gathered properly. If the value is the result of a less certain data gathering process, it will have a quality value of 'DOUBTFUL'. Some of the values gathered from the sensors are the result of exception cases. These data points are NULL values.

In an embodiment, the historian device 104 implements one or more quality rules in a quality rules mode at 305 that indicates what quality of data points to consider at 306 when responding to a query from the client device 102 and determining the count. In one embodiment, data points are evaluated and identified as having a 'GOOD' quality value or having a 'DOUBTFUL' quality value or having a 'BAD' quality value. For example, 'GOOD' quality value data points can be defined including data points falling with a pre-set, variable, calculated, or determined range whereas 'DOUBTFUL' quality value data points can be defined as including data values outside the range and 'BAD' quality value data points can be identified as NULL data points and/or data points within the range but not consistent with previous or subsequent data (e.g., deviating from a trend). As another example, a 'DOUBTFUL' quality is less than a preset 'GOOD' quality value having a percentage value of the preset quality value, such as 90% of the preset 'GOOD' quality value. As another example, a 'BAD' quality is less than a preset 'GOOD' quality value having a percentage value of the preset quality value, such as 80% of the preset 'GOOD' quality value. In one embodiment, retrieved values with a 'BAD' quality value (e.g., less than a minimum quality value) indicate there are gaps in the data.

In one embodiment, the quality rules mode is one of 'GOOD', 'EXTENDED', or 'OPTIMISTIC':

A 'GOOD' quality rule mode wherein the historian device includes in the retrieval calculations data points with a 'GOOD' quality and includes data points with a 'BAD' quality, wherein data points with a 'DOUBTFUL' quality will not be included in a calculation;

An 'EXTENDED' quality rule mode means that the historian device 104 includes in the retrieval calculations data values with both a 'GOOD' quality, a 'BAD' quality, and a 'DOUBTFUL' quality.

an 'OPTIMISTIC' quality rule mode wherein the historian device includes in the retrieval calculations data points with both a 'GOOD' quality and a 'DOUBTFUL' quality except that data points with a 'BAD' quality will not be included in a calculation.

In one embodiment, the historian device sets an 'OPTIMISTIC' quality rule mode wherein the historian device includes in its retrieval calculations data points except a "BAD" quality data point and, optionally, at least one of the following:

if a "BAD" quality data point is encountered, then a last known 'GOOD' quality data point or a last known 'DOUBTFUL' quality data point is used as if the "BAD" quality data point never occurred;

if a "BAD" quality data point is encountered, then a last known 'GOOD' quality data point or a last known 'DOUBTFUL' quality data point is used as if the "BAD" quality data point never occurred; wherein if a particular data point is a "BAD" quality data point and if there are no points prior to the start of the query, then 0.0 will be used as a starting base value for the particular "BAD" quality data point;

if a "BAD" quality data point is encountered, then a last known 'GOOD' quality data point or a last known 'DOUBTFUL' quality data point is used as if the "BAD" quality data point never occurred; wherein if a particular data point is a "BAD" quality data point and if there are no points prior to the start of the query, then 0.0 will be used as a starting base value for the particular "BAD" quality data point, and then the value change for the cycle is calculated from the first actual data point in the cycle, rather than 0.0.

The 'OPTIMISTIC' quality rule mode allows retrieval and return of possibly incomplete results which are often better than returning NULL otherwise. Instead of refraining from calculating values that would include data gaps, the last known good value prior to the gap is used if possible. For instance, FIG. 4 shows a gap in data between P9 and P10. If it is assumed that P9 is a NULL value, in 'OPTIMISTIC' quality rule mode, the historian device 104 would still calculate the value Pc2 by taking into account the previous good value, P8. Instead of returning a NULL value because of P9, the value returned will be based on P8. The gap between P8 and P10 will then be determined to be a rollover, reset, or reversal as described above. The value for Pc3 would also be calculated by taking into account the value of P8 instead of simply returning NULL based on P9. With the inclusion of P8, the cycle from Tc2 to Tc3 would treat P8 as the final value of the previous cycle, completing the cycle used to calculate Pc3.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and process without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

The Abstract is provided to help the reader quickly ascertain the nature of the technical disclosure. It is submitted with the understanding that it will not be used to interpret or limit the scope or meaning of the claims.

What is claimed is:

1. A method of retrieving data from an historian device in a process control environment comprising:

receiving in the historian device, a query for a result over a timeframe by an historian device from a client device connected to the historian device;

selecting by the historian device, data points within the timeframe;

identifying in the historian device, data points as having a 'GOOD' quality, a 'BAD' quality, or a 'DOUBTFUL' quality;

setting in the historian device, an 'OPTIMISTIC' quality rule mode wherein the historian device includes in the retrieval calculations data points with both a 'GOOD' quality and a 'DOUBTFUL' quality except that 'BAD' quality data points will not be included in a calculation;

wherein the determined amount of products by the historian device is based on the included data points; and wherein the historian device returns the determined amount of products to the client device.

2. The method of claim 1 wherein at least one of the following:

if a "BAD" quality data point is encountered, then a last known 'GOOD' quality data point or a last known 'DOUBTFUL' quality data point is used as if the "BAD" quality data point never occurred;

if a "BAD" quality data point is encountered, then a last known 'GOOD' quality data point or a last known 'DOUBTFUL' quality data point is used as if the "BAD" quality data point never occurred; wherein if a particular data point is a "BAD" quality data point and if there are no points prior to the start of the query, then 0.0 will be used as a starting base value for the particular "BAD" quality data point; and if a "BAD" quality data point is encountered, then a last known 'GOOD' quality data point or a last known 'DOUBTFUL' quality data point is used as if the "BAD" quality data point never occurred; wherein if a particular data point is a "BAD" quality data point and if there are no points prior to the start of the query, then 0.0 will be used as a starting base value for the particular "BAD" quality data point, and then the value change for the cycle is calculated from the first actual data point in the cycle, rather than 0.0.

3. The method of claim 2 further comprising:

incrementing by a counter, a count value at a rate at which products pass through the process element;

rolling over the count value to zero by the counter when the count value reaches a rollover value R after which the counter rolls the count value over to 0 and continues incrementing;

receiving by the historian device connected to the counter, count value data points periodically;

setting, in the historian device, a deadband value D for distinguishing among rollovers, resets, and/or reversals;

querying by the client device from the historian device, an amount of products passed through the process element for a timeframe;

selecting by the historian device, a set of count value data points received within the queried timeframe; and determining by the historian device, based on the selected data points, an amount of products passed through the process element.

4. The method of claim 3 wherein the determining comprises:

determining a reset has occurred if a first data point is greater than a following data point and the first data point is less than R*(1−D/100) and the following data point is less than R*D/100, and determining the amount of products passed through the process element based on the determined reset;

determining a reversal has occurred if the first data point is greater than the following data point and the difference between the first data point and the following data point is less than R*D/100, and determining the amount of products passed through the process element based on the determined reversal; and determining a rollover has occurred if the first data point is greater than the following data point and it has not been determined that reset has occurred between the first and following data points and it has not been determined that a reversal has occurred between the first and following data points, and determining the amount of products passed through the process element based on the determined rollover.

5. A historian memory storage device and a historian processor including a counter, said historian memory storage device storing statistical data and storing processor-executable instructions for execution by the historian processor for implementing a historian connection module and a historian server module, said processor-executable instructions configured for, when executed by the historian processor:

receiving in the historian device, a query for a result over a timeframe by an historian device from a client device connected to the historian device;

selecting by the historian device, data points within the timeframe;

identifying in the historian device, data points as having a 'GOOD' quality, a 'BAD' quality, or a 'DOUBTFUL' quality;

setting, in the historian device, an 'OPTIMISTIC' quality rule mode wherein the historian device includes in the retrieval calculations data points with both a 'GOOD' quality and a 'DOUBTFUL' quality except that 'BAD' quality data points will not be included in a calculation;

wherein the determined amount of products by the historian device is based on the included data points; and wherein the historian device returns the determined amount of products to the client device.

6. The device of claim 5 wherein the determining processor-executable instructions are configured for at least one of the following:

if a "BAD" quality data point is encountered, then a last known 'GOOD' quality data point or a last known 'DOUBTFUL' quality data point is used as if the "BAD" quality data point never occurred;

if a "BAD" quality data point is encountered, then a last known 'GOOD' quality data point or a last known 'DOUBTFUL' quality data point is used as if the "BAD" quality data point never occurred; wherein if a particular data point is a "BAD" quality data point and if there are no points prior to the start of the query, then 0.0 will be used as a starting base value for the particular "BAD" quality data point; and if a "BAD" quality data point is encountered, then a last known 'GOOD' quality data point or a last known 'DOUBTFUL' quality data point is used as if the "BAD" quality data point never occurred; wherein if a particular data point is a "BAD" quality data point and if there are no points prior to the start of the query, then 0.0 will be used as a starting base value for the particular "BAD" quality data point, and then the value change for the cycle is calculated from the first actual data point in the cycle, rather than 0.0.

7. The device of claim 6 wherein the determining processor-executable instructions are configured for:

incrementing by a counter, a count value at a rate at which products pass through the process element;

rolling over the count value to zero by the counter when the count value reaches a rollover value Rafter which the counter rolls the count value over to 0 and continues incrementing;

receiving by the historian device connected to the counter, count value data points periodically;

setting, in the historian device, a deadband value D for distinguishing among rollovers, resets, and/or reversals;

querying by the client device from the historian device, an amount of products passed through the process element for a timeframe;

selecting by the historian device, a set of count value data points received within the queried timeframe; and determining by the historian device, based on the selected data points, an amount of products passed through the process element.

8. The device of claim 7 wherein the determining processor-executable instructions are configured for:

determining a reset has occurred if a first data point is greater than a following data point and the first data point is less than R*(1−D/100) and the following data point is less than R*D/100, and determining the amount of products passed through the process element based on the determined reset;

determining a reversal has occurred if the first data point is greater than the following data point and the difference between the first data point and the following data point is less than R*D/100, and determining the amount of products passed through the process element based on the determined reversal; and determining a rollover has occurred if the first data point is greater than the following data point and it has not been determined that reset has occurred between the first and following data points and it has not been determined that a reversal has occurred between the first and following data points, and determining the amount of products passed through the process element based on the determined rollover.

* * * * *